(12) United States Patent
Yasuda

(10) Patent No.: US 12,331,967 B2
(45) Date of Patent: Jun. 17, 2025

(54) COOLING DEVICE

(71) Applicants: Shonan Trading Co., Ltd., Yokohama (JP); Makoto Yasuda, Yachiyo (JP)

(72) Inventor: Makoto Yasuda, Yachiyo (JP)

(73) Assignees: Shonan Trading Co., Ltd., Yokahama (JP); Makota Yashoda, Yachiyo (JP)

( * ) Notice: Subject to any disclaimer, the term of this patent is extended or adjusted under 35 U.S.C. 154(b) by 46 days.

(21) Appl. No.: 18/265,789

(22) PCT Filed: Jul. 15, 2021

(86) PCT No.: PCT/JP2021/026697
§ 371 (c)(1),
(2) Date: Jun. 7, 2023

(87) PCT Pub. No.: WO2022/123819
PCT Pub. Date: Jun. 16, 2022

(65) Prior Publication Data
US 2024/0035713 A1 Feb. 1, 2024

(30) Foreign Application Priority Data

Dec. 8, 2020 (JP) ................................. 2020-203727

(51) Int. Cl.
*F25B 19/00* (2006.01)
*B29C 35/16* (2006.01)
(Continued)

(52) U.S. Cl.
CPC .............. *F25B 19/00* (2013.01); *B29C 35/16* (2013.01); *B29C 48/911* (2019.02); *B29C 2035/1691* (2013.01); *B29C 48/06* (2019.02)

(58) Field of Classification Search
CPC ................... B29C 35/16; B29C 48/911; B29C 2035/1691; F25B 25/005
See application file for complete search history.

(56) References Cited

FOREIGN PATENT DOCUMENTS

| EP | 3133357 A1 | 2/2017 |
|---|---|---|
| JP | 2000154957 A * | 6/2000 |

(Continued)

OTHER PUBLICATIONS

International Preliminary Report on Patentability (PCT Chapter I) issued Jun. 13, 2023 for International Application No. PCT/JP2021/026697, and English Translation thereof.
(Continued)

*Primary Examiner* — Lionel Nouketcha
(74) *Attorney, Agent, or Firm* — MCGINN I.P. LAW GROUP, PLLC

(57) ABSTRACT

Provided is a cooling device using the vaporization heat of water, the cooling device capable of eliminating the need for a continuous supply of a large amount of water from the outside and reducing an environmental load. A cooling device 1 which cools a cooling target object 3 using vaporization heat of water includes: an air circulation mechanism 10 including an air circulation path 11 including a target object cooling section 11*a* for cooling the cooling target object 3 with the air mixed with the atomized water and an air cooling section 11*b* for cooling the heated air; and a water circulation mechanism 20 including a discharge portion 21 for discharging the water in the target object cooling section 11*b*, a tank 22 for collecting water condensed in the air cooling section 10*b*, and a pump 22 for delivering the water in the tank 22 to the discharge portion 21.

2 Claims, 2 Drawing Sheets

(51) Int. Cl.
    *B29C 48/88*    (2019.01)
    *B29C 48/06*    (2019.01)

(56) References Cited

FOREIGN PATENT DOCUMENTS

| | | |
|---|---|---|
| JP | 2009-300077 A | 12/2009 |
| JP | 2016-517503 A | 6/2016 |
| TW | 1387716 B | 3/2012 |

OTHER PUBLICATIONS

Enlighs Translation of Written Opinion of the International Searching Authority in International Application No. PCT/JP2021/026697.
Taiwanese Office Action, dated Feb. 8, 2025 in Taiwanese Application No. 110142364 and English Translation Thereof.

* cited by examiner

COOLING DEVICE

TECHNICAL FIELD

The present invention relates to a cooling device that exposes a cooling target object to air containing atomized water and uses the vaporization heat of the water to cool the cooling target object.

BACKGROUND ART

As a cooling device for high-temperature parts, there is proposed a cooling device including a cooling chamber that accommodates high-temperature parts, a transfer device that transfers high-temperature parts in the cooling chamber, a cooling air supply device that blows cooling air into the cooling chamber, a water tank container that communicates with the cooling chamber in an upper space and has a water tank in a lower space, and a spray device that sprays water into the upper space (see PTL 1). In this cooling device, the cooling air is circulated between the cooling chamber and the water tank container by the cooling air supply device, and the cooling air in the water tank container is cooled by the spray device. Since this cooling device uses air to cool high-temperature components, it has a limited cooling capacity.

There is also known a method of cooling a cooling target object with air with atomized water (see PTL 2). In PTL 2, a polycarbonate resin that is melt-kneaded and extruded by an extruder is cooled with air containing atomized water and cut into pellets.

CITATION LIST

Patent Literature

PTL 1: JP 2006-258384A
PTL 2: JP 2017-197703A

SUMMARY OF INVENTION

Technical Problem

However, in the cooling device described in PTL 2, since water for cooling is continuously consumed, a large amount of water must be continuously supplied from the outside, which limits the installation conditions of the device. Furthermore, since the heated air and vaporized water vapor are discharged to the atmosphere as they are, there is concern about the environmental load.

The present invention has been made in view of the above-mentioned problems, and an object thereof is to provide a cooling device using the vaporization heat of water, the cooling device capable of eliminating the need for a continuous supply of a large amount of water from the outside and reducing an environmental load.

Solution to Problem

In order to achieve the above object, the present invention provides a cooling device that exposes a cooling target object to air mixed with atomized water and uses vaporization heat of water to cool the cooling target object, the cooling device including: an air circulation mechanism including an air circulation path including a target object cooling section for cooling the cooling target object with the air mixed with the atomized water and an air cooling section for cooling the air heated in the target object cooling section, and a fan that circulates the air in the air circulation path; and a water circulation mechanism including a discharge portion for discharging the water mixed into the air in the target object cooling section of the air circulation path, a tank for collecting water condensed in the air cooling section of the air circulation path, and a pump for delivering the water in the tank to the discharge portion.

According to this cooling device, the cooling target object is exposed to air containing atomized water in the target object cooling section of the air circulation path, and is cooled by the vaporization heat of the evaporating water. At this time, since the air cooled and dehumidified in the air cooling section flows into the target object cooling section, water is efficiently vaporized. The air heated and humidified in the target object cooling section is cooled and dehumidified in the air cooling section, and then flows into the target object cooling section again. Therefore, heated air will not be discharged to the atmosphere.

The water vapor vaporized in the target object cooling section flows into the air cooling section in a state of being contained in the air. When the air is cooled in the air cooling section, the amount of saturated water vapor is reduced, so that part of the water vapor is condensed. The condensed water is collected in the tank. The water in the tank is delivered to the discharge portion disposed in the target object cooling section and used again for cooling the cooling target object. Therefore, vaporized water vapor is not discharged to the atmosphere.

In the cooling device, it is preferable that the cooling device includes a refrigerating circuit which has, in this order, a compressor, a condenser, an expansion valve, and an evaporator arranged in the air cooling section of the air circulation path to cool air, and through which a predetermined refrigerant flows, the air circulation path includes an air heating section for heating the air cooled in the air cooling section before flowing into the target object cooling section, and the refrigerating circuit has an air heating heat exchanger provided in parallel with the condenser between the compressor and the expansion valve and arranged in the air heating section of the air circulation path.

According to this cooling device, the air in the air cooling section is cooled by the evaporator of the refrigerating circuit, and the air in the air heating section is heated by the heat exchanger of the refrigerating circuit. That is, the air that has been cooled and dehumidified in the air cooling section is heated and dehumidified before entering the target object cooling section. In this way, vaporization of water in the target object cooling section can be performed more efficiently.

In the cooling device, it is preferable that the water circulation mechanism includes a water cooling portion that cools water before being delivered to the discharge portion, and the refrigerating circuit has a water cooling heat exchanger provided between the evaporator and the compressor and arranged in the water cooling portion.

According to this cooling device, the water cooled by the heat exchanger of the refrigerating circuit is supplied to the target object cooling section. In this way, the cooling effect of the cooling target object in the target object cooling section is increased.

In the cooling device, it is preferable that the air circulation mechanism has a steam separator that is installed at a predetermined location in the air circulation path to separate air and water, and the water circulation mechanism has a guide path for guiding the water separated from air by the steam separator to the tank.

According to this cooling device, the water that has not vaporized in the target object cooling section is separated from the air by the steam separator and collected in the tank through the guide path.

In the cooling device, it is preferable that the water circulation mechanism includes a detector for detecting an amount of water stored in the tank, and a water storage control unit that replenishes the tank with water from the outside when the amount of water detected by the detector falls below a predetermined amount.

According to this cooling device, when the amount of water stored in the tank falls below a predetermined amount, the tank is replenished with water from the outside. In this way, there will be no shortage of water supplied to the target object cooling section.

Advantageous Effects of Invention

According to the cooling device of this invention, it is not necessary to continuously supply a large amount of water from the outside, and the cooling target object can be cooled using the vaporization heat of water. In addition, the air and water vapor used for cooling are not discharged to the atmosphere as they are, so that the environmental load can be reduced.

DESCRIPTION OF EMBODIMENTS

Figure 1:
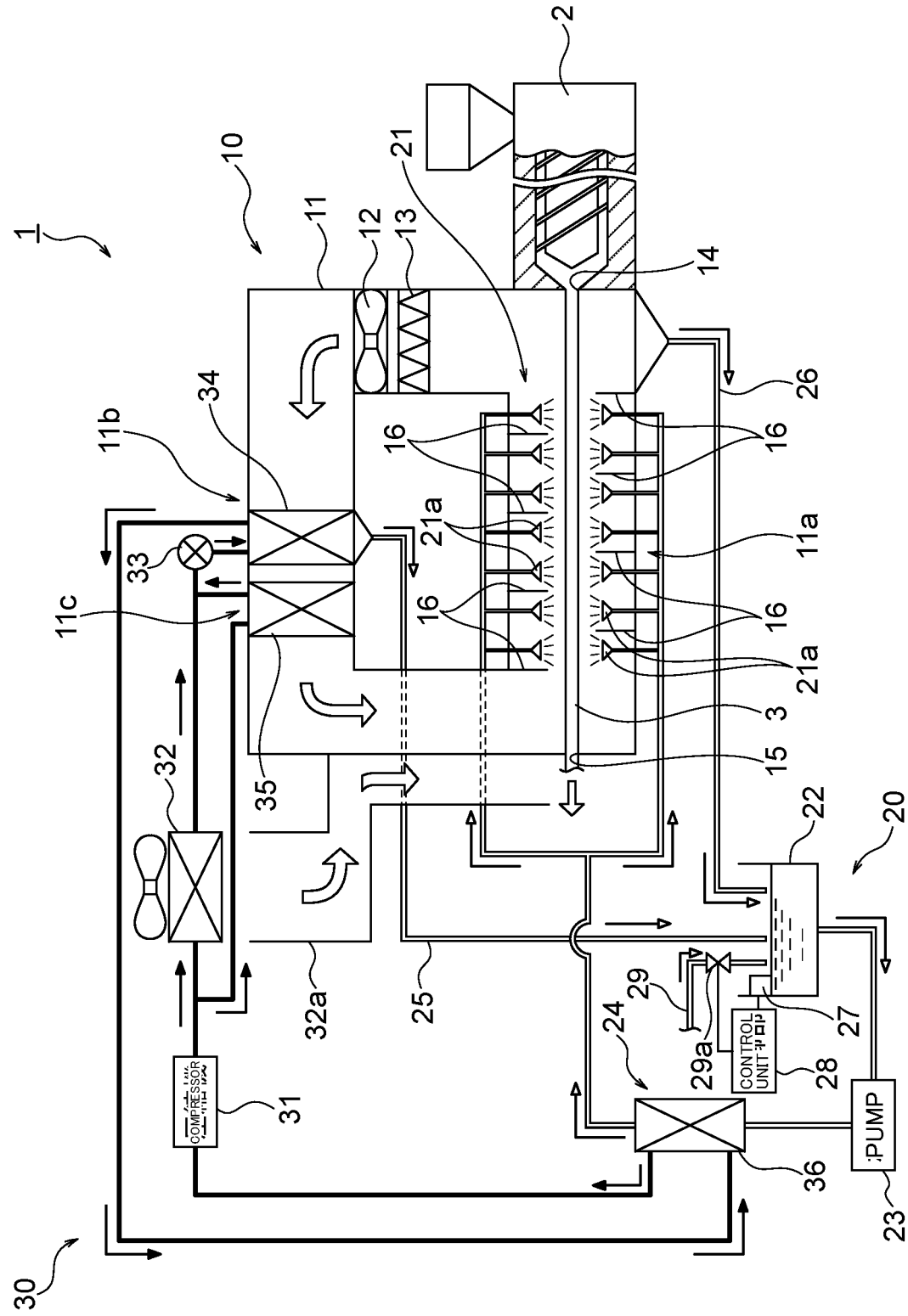
FIG. 1 is a schematic explanatory diagram of a cooling device showing an embodiment of the present invention.

As shown in FIG. 1, this cooling device 1 cools a molten resin 3 extruded from an extruder 2 in a rod shape. The molten resin 3 is continuously extruded, cooled by the cooling device 1, and then cut by a cutter into pellets. The cooling device 1 exposes the molten resin 3 as a cooling target object to air mixed with atomized water, and cools the molten resin 3 using the vaporization heat of water. Any material can be used for the molten resin 3, and for example, polyethylene terephthalate, polypropylene, or the like can be used. The cooling device 1 includes an air circulation mechanism 10 that circulates air, a water circulation mechanism 20 that circulates water, and a refrigerating circuit 30 that cools and heats air and cools water.

The air circulation mechanism 10 has an air circulation path 11 in which air circulates and a fan 12 that circulates the air in the air circulation path. The air circulation path 11 includes a target object cooling section 11a for cooling the molten resin 3 with air mixed with atomized water, an air cooling section 11b for cooling the air heated in the target object cooling section 11a, and an air heating section 11c for heating the air cooled in the air cooling section 11b before entering the target object cooling section 11a. The air circulation mechanism 10 also has a steam separator 13 that separates the air that has flowed out from the target object cooling section 11a from water. In the present embodiment, the steam separator 13 is provided upstream of the fan 12.

An inlet 14 and an outlet 15 for the molten resin 3 are formed in the air circulation path 11. In the present embodiment, the inlet 14 and the outlet 15 are kept airtight by sealing means such as rubber that allows the molten resin 3 to move. The molten resin 3 is stretched from the inlet 14 to the outlet 15 and extends over the target object cooling section 11a. In the present embodiment, the inlet 14 is arranged downstream of the outlet 15 in the air circulation direction in the air circulation path 11. That is, the molten resin 3 extruded from the extruder 2 moves in the direction opposite to the air circulation direction in the target object cooling section 11a. In the present embodiment, a cutter arranged outside the outlet 15 has a resin delivery mechanism, and this delivery mechanism moves the molten resin 3 in the target object cooling section 11a. That is, the delivery mechanism of the cutter serves as a mechanism for moving the molten resin 3.

In addition, the air circulation path 11 is provided with a plurality of baffle plates 16 that allow the air to meander around the molten resin 3. In the present embodiment, the molten resin 3 and target object cooling section 11a extend in a horizontal direction, and the baffle plates 16 are horizontally spaced above and below the passage. Water is supplied from the water circulation mechanism 20 to the target object cooling section 11a, and air mixed with atomized water meanders along the molten resin 3.

In the present embodiment, the air circulation path 11 has an air volume adjustment damper 17 provided upstream of the target object cooling section 11a. When the opening degree of the air volume adjustment damper 17 is decreased, the air pressure in the target object cooling section 11a is decreased.

The water circulation mechanism 20 includes a discharge portion 21 that discharges water mixed with air in the target object cooling section 11a of the air circulation path 11, a tank 22 that collects water condensed in the air cooling section 11b of the air circulation path 11, a pump 23 for delivering the water in the tank 22 to the discharge portion 21, and a water cooling portion 24 for cooling the water before it is delivered to the discharge portion 21. The water circulation mechanism 20 also includes a first guide path 25 that guides the water condensed in the air cooling section 11b to the tank 22, and a second guide path 26 that guides the water separated from the air by the steam separator 13 of the air circulation mechanism 10 to the tank 22.

In the present embodiment, the discharge portion 21 includes a plurality of spray nozzles 21a arranged in the target object cooling section 11a to spray water toward the molten resin 3, and a spray nozzle 21b for spraying water toward the air heated by the molten resin 3 on the downstream side of the molten resin 3. The spray nozzles 21a for spraying water toward the molten resin 3 are arranged along the molten resin 3 at intervals. In the present embodiment, each spray nozzle 21a is arranged in a meandering section where each baffle plate 16 is installed with a gap above and below the molten resin 3 extending in the horizontal direction. The spray nozzle 21b for spraying water toward the air on the downstream side of the molten resin 3 is arranged downstream of the meandering section where each baffle plate 16 is installed.

The water circulation mechanism 20 also includes a detector 27 that detects the amount of water stored in the tank 22, and a water storage control unit 28 that replenishes the tank 22 with water from the outside when the amount of water detected by the detector 27 falls below a predetermined amount. Specifically, the water circulation mechanism 20 has a water supply path 29 from the outside to the tank 22 and an on/off valve 29a provided in the water supply path 29, and the water storage control unit 28 controls the on/off state of the on/off valve 29a based on the signal from the detector 27.

The refrigerating circuit 30 has a compressor 31, a condenser 32, an expansion valve 33, and an evaporator 34 in this order, through which a predetermined refrigerant flows. Any type of refrigerant can be used, but for example, R32, R410A, and the like can be used. The evaporator 34 is arranged in the air cooling section 11b of the air circulation path 11 to perform heat exchange between the refrigerant and the circulating air to cool the circulating air. The condenser 32 is arranged outside the air circulation path 11 and performs heat exchange between the refrigerant and the outside air. In the present embodiment, an air guide path 32a is provided to guide the outside air heat-exchanged by the condenser 32 to the molten resin 3 delivered from the outlet 15 of the air circulation path 11. In this way, the exhaust heat of the refrigerating circuit 30 can be used to accelerate the drying of the molten resin 3. It should be noted that the outside air heat-exchanged by the condenser 32 may be guided to a raw material resin to be introduced into the extruder 2. In this case, it is possible to heat the raw material resin in advance using the exhaust heat of the refrigerating circuit 30 and accelerate the melting of the resin in the extruder 2.

In the present embodiment, the refrigerating circuit 30 has an air heating heat exchanger 35 provided in parallel with the condenser 32 between the compressor 31 and the expansion valve 33 and arranged in the air heating section 11c of the air circulation path 11. The heat exchanger 35 heats the circulating air by performing heat exchange between the refrigerant and the circulating air.

In the present embodiment, the refrigerating circuit 30 includes a water cooling heat exchanger 36 provided between the evaporator 34 and the compressor 31 and arranged in the water cooling portion 24 of the water circulation mechanism 20. This heat exchanger 36 performs heat exchange between the refrigerant and water to cool the water.

According to the cooling device 1 configured as described above, the molten resin 3 is exposed to air containing atomized water in the target object cooling section 11a of the air circulation path 11, and is cooled by the vaporization heat of the evaporated water. The air heated and humidified by the molten resin 3 flows into the air cooling section 11b and is cooled and dehumidified by the evaporator 34 of the refrigerating circuit 30. According to the present embodiment, since the spray nozzle 21b is provided on the downstream side of the molten resin 3, the air heated by the molten resin 3 is cooled before entering the air cooling section 11b, and the load of the evaporator 34 of the refrigerating circuit 30 is reduced. The air cooled and dehumidified in the air cooling section 11b flows into the air heating section 11c and is heated and dehumidified by the heat exchanger 35 of the refrigerating circuit 30. In this way, since the air flowing into the target object cooling section 11a is dehumidified in the air cooling section 11b and then heated and dehumidified in the air heating section 11c, the water can be efficiently vaporized in the target object cooling section 11a. Further, by decreasing the opening degree of the air volume adjustment damper 17, the pressure in the target object cooling section 11a can be decreased, and the vaporization of water can be accelerated.

The water vapor vaporized in the target object cooling section 11a flows into the air cooling section 11b in a state of being contained in the air. When the air is cooled in the air cooling section 11b, the amount of saturated water vapor is reduced, so that part of the water vapor is condensed. The condensed water is collected in the tank 22 through the first guide path 25. The water that has not been vaporized in the target object cooling section 11a is separated from the air by the steam separator 13 and collected in the tank 22 through the second guide path 26. The water in the tank 22 is delivered to the discharge portion 21 arranged in the target object cooling section 11a and used for cooling the molten resin 3 again. According to the present embodiment, since the water cooled by the heat exchanger 36 of the refrigerating circuit 30 is supplied to the target object cooling section 11a, the cooling effect of the molten resin 3 in the target object cooling section 11a is increased.

As described above, according to the cooling device 1 of the present embodiment, the molten resin 3 can be cooled using the vaporization heat of water without continuously supplying a large amount of water from the outside. In addition, the air and water vapor used for cooling are not discharged to the atmosphere as they are, so that the environmental load can be reduced. Furthermore, since the water storage control unit 28 supplies water to the tank 22 from the outside when the amount of water stored in the tank 22 falls below a predetermined amount, there will be no shortage of water supplied to the target object cooling section 11a.

Since the air in the air circulation path 11 is caused to meander around the molten resin 3, the path of the air passing through the molten resin 3 is lengthened, and the cooling of the molten resin 3 by the air containing atomized water can be performed more efficiently.

Figure 2:
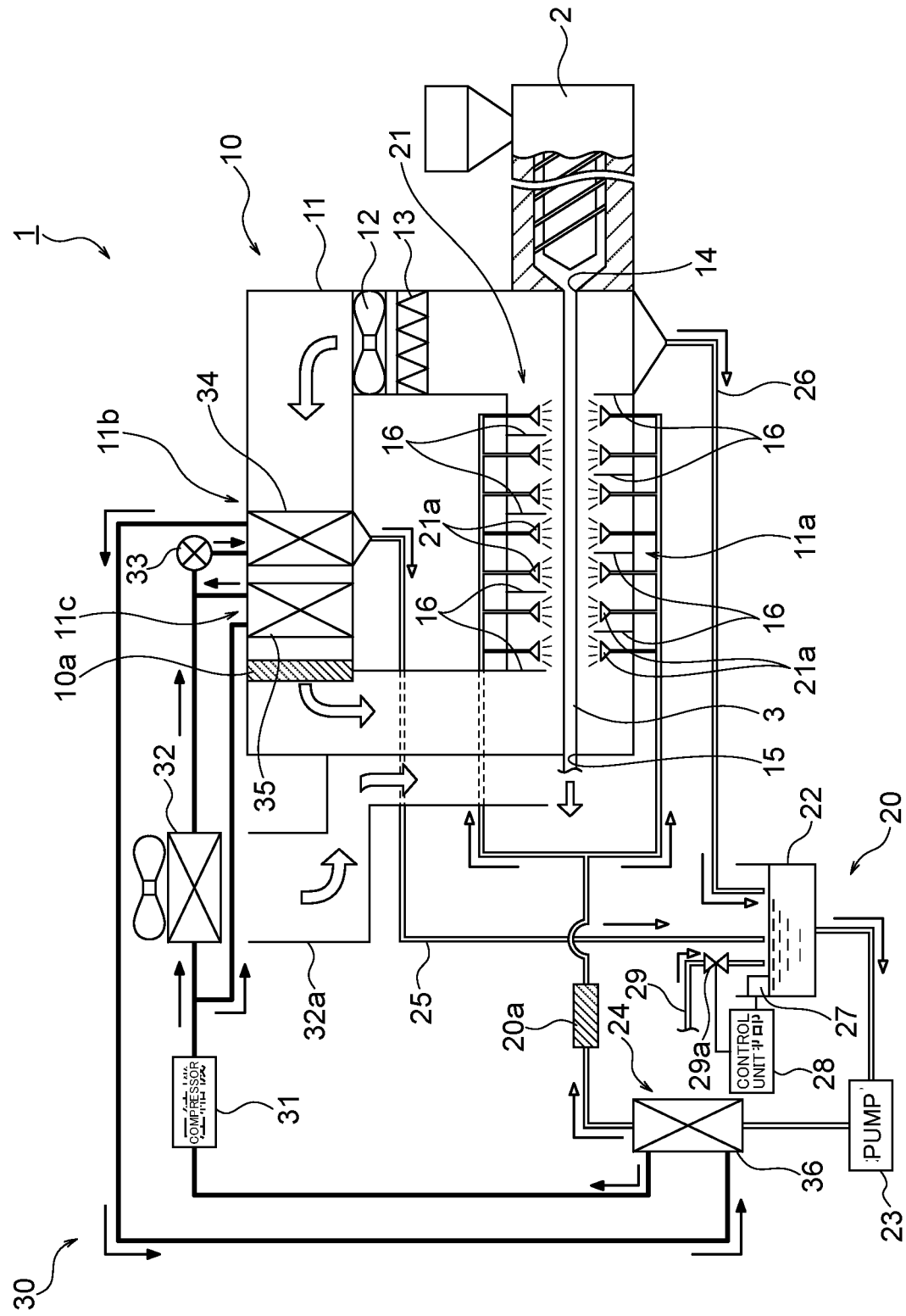
FIG. 2 is a schematic explanatory diagram of a cooling device showing a modified example.

In the above-described embodiment, a filter 10a for purifying circulating air and a filter 20a for purifying circulating water can be appropriately provided as shown in FIG. 2, for example. In the cooling device 1 of FIG. 2, the filter 10a of the air circulation mechanism 10 is provided between the air heating section 11c and the target object cooling section 11a, and the filter 20a of the water circulation mechanism 20 is provided between the water cooling portion 24 and the discharge portion 21. For example, when a HEPA filter is used as the filter 10a, a high degree of cleanliness of the air in the air circulation path 11 is achieved. For example, when a sterilizing filter is used as the filter 20a, the sanitary condition of the water used for cooling the molten resin 3 can be maintained. Thus, the configuration in which the filters 10a and 20a are provided is suitable for cooling medical instruments such as catheters that require a high degree of cleanliness.

In the above-described embodiment, the steam separator 13 is provided upstream of the fan 12, but the steam separator 13 can be installed at any location. For example, the steam separator 13 may be provided between the evaporator 34 and the air heating heat exchanger 35. The steam separator 13 may be provided both upstream of the fan 12 and between the evaporator 34 and the air heating heat exchanger 35.

In the above-described embodiment, although the molten resin 3 is cooled, other materials may be cooled, for example, heat-treated metal may be cooled. In addition, although the molten resin 3 is extruded and moved while being stretched from the inlet 14 to the outlet 15, the cooling target object may be moved by any method. For example, the cooling target object may be placed on a belt or the like and conveyed through the target object cooling section 11a. In this case, it is preferable that the inlet 14 and the outlet 15 are configured to keep the air circulation path 11 airtight by, for example, providing a plurality of doors.

In the above-described embodiment, the target object cooling section 11a extends in the horizontal direction, but it may, for example, extend in the vertical direction, and the extension direction of the target object cooling section 11 can be changed arbitrarily. Furthermore, in the above-described embodiment, the molten resin 3 moves in the direction opposite to the air circulation direction. However, the cooling target object may move in the same direction as the air circulation direction, for example. The moving direction of the cooling target object in the target object cooling section can be changed arbitrarily.

In the above-described embodiment, the discharge portion 21 includes the plurality of spray nozzles 21a for spraying water toward the molten resin 3 and the spray nozzle 21b for spraying water toward the air on the downstream side of the molten resin 3. However, for example, the discharge portion 21 may be configured as a discharge port for discharging water at the inlet of the target object cooling section 11a so that atomized water is spread throughout the target object cooling section 11a.

In the above-described embodiment, the plurality of baffle plates 16 allow the air to meander around the molten resin 3, but the baffle plates 16 may be omitted according to the required cooling capacity or the like. Furthermore, the steam separator 13, the air heating heat exchanger 35, the water cooling heat exchanger 36, the air guide path 32a, and the like can be appropriately omitted as needed. Furthermore, cooling of the air by the air cooling section 11b may be performed by means other than the refrigerating circuit 30.

Although the embodiment of the invention has been described above, the invention according to claims is not to be limited to the above-mentioned embodiment. Further, it should be noted that all combinations of the features described in the embodiment are not essential to the means for solving the problems of the invention.

REFERENCE SIGNS LIST

1 Cooling device
2 Extruder
3 Molten resin
10 Air circulation mechanism
10a Filter
11 Air circulation path
11a Target object cooling section
11b Air cooling section
11c Air heating section
12 Fan
13 Steam separator
14 Inlet
15 Outlet
16 Baffle plate
17 Air volume adjustment damper
20 Water circulation mechanism
21 Discharge portion
21a Spray nozzle
21b Spray nozzle
22 Tank
23 Pump
24 Water cooling portion
25 First guide path
26 Second guide path
27 Detector
28 Water storage control unit
29 Water supply path
29a On/off valve
30 Refrigerating circuit
31 Compressor
32 Condenser
32a Air guide path
33 Expansion valve
34 Evaporator
35 Air heating heat exchanger
36 Water cooling heat exchanger

The invention claimed is:

1. A cooling device that exposes a cooling target object to air mixed with atomized water and uses vaporization heat of water to cool the cooling target object, the cooling device comprising:
   an air circulation mechanism including:
      an air circulation path including:
         a target object cooling section for cooling the cooling target object with the air mixed with the atomized water; and
         an air cooling section for cooling the air heated in the target object cooling section; and
      a fan that circulates the air in the air circulation path; and
   a water circulation mechanism including:
      a discharge portion for discharging the water mixed into the air in the target object cooling section of the air circulation path;
      a tank for collecting water condensed in the air cooling section of the air circulation path; and
      a pump for delivering the water in the tank to the discharge portion; and
   a refrigerating circuit which includes:
      a compressor;
      a condenser;
      an expansion valve; and
      an evaporator arranged in the air cooling section of the air circulation path to cool air,
   wherein a predetermined refrigerant flows through the compressor, the condenser, the expansion valve, and an evaporator sequentially in this order,
   wherein the air circulation path includes an air heating section for heating the air cooled in the air cooling section before flowing into the target object cooling section, and
   wherein the refrigerating circuit has an air heating heat exchanger provided in parallel with the condenser and the air heating exchanger is provided between the compressor and the expansion valve and arranged in the air heating section of the air circulation path.

2. The cooling device according to claim 1, wherein the water circulation mechanism includes a water cooling portion that cools water before being delivered to the discharge portion, and
   wherein the refrigerating circuit has a water cooling heat exchanger provided between the evaporator and the compressor and arranged in the water cooling portion.

* * * * *